United States Patent [19]

Arens

[11] 4,374,889

[45] Feb. 22, 1983

[54] OIL-REPELLENT MICROVOID-IMAGING MATERIAL

[75] Inventor: Robert P. Arens, St. Paul, Minn.

[73] Assignee: Minnesota Mining and Manufacturing Company, St. Paul, Minn.

[21] Appl. No.: 327,768

[22] Filed: Dec. 7, 1981

[51] Int. Cl.$^3$ ........................ B41M 5/00; G01D 15/34

[52] U.S. Cl. .................................... 428/207; 428/211; 428/315.5

[58] Field of Search ...................... 428/207, 211, 315.5, 428/315.7, 315.9, 317.9

[56] References Cited

U.S. PATENT DOCUMENTS

| | | | |
|---|---|---|---|
| 2,086,903 | 3/1928 | Ellis | 428/481 |
| 2,114,393 | 4/1936 | Lane | 428/274 |
| 2,299,991 | 10/1942 | Kallock | 346/1.1 |
| 2,803,615 | 8/1957 | Ahlbrecht et al. | 524/805 |
| 2,803,656 | 8/1957 | Ahlbrecht et al. | 564/96 |
| 2,854,350 | 9/1958 | Phillpotts | 428/499 |
| 2,920,979 | 1/1960 | Hessburg | 428/306.6 |
| 2,934,450 | 4/1960 | Brown | 106/287.18 |
| 3,031,328 | 4/1962 | Larsen | 427/394 |
| 3,094,547 | 6/1963 | Heine | 260/947 |
| 3,247,006 | 4/1966 | Hoge et al. | 428/317.9 |
| 3,508,344 | 4/1970 | Thomas | 434/327 |
| 3,574,791 | 4/1971 | Sherman et al. | 525/276 |
| 3,916,053 | 10/1965 | Sherman et al. | 428/96 |
| 3,950,298 | 4/1976 | McKown et al. | 524/544 |
| 4,064,304 | 12/1977 | Fujita et al. | 428/207 |
| 4,299,880 | 11/1981 | Arens | 428/315.5 |

OTHER PUBLICATIONS

J. J. Clancy, "Microvoid Coatings in Graphic Art Applications. A Patent Survey", *Industrial Engineering Chemistry Prod. Res. Develop.*, vol. 13, No. 1, 1974, pp. 30–33.

Jerome A. Seiner, "Microvoids as Pigments. A Review", *Industrial Engineering Chemistry Prod. Res. Dev.*, vol. 17, No. 4, 1978, pp. 302–317.

*Primary Examiner*—William J. Van Balen

*Attorney, Agent, or Firm*—Cruzan Alexander; Donald M. Sell; Richard E. Brink

[57] ABSTRACT

Re-usable sheet material, having a dark colored base sheet provided on each side with a microvoid layer, temporarily imageable by application of volatile liquids, is treated on the face side with oleophobic (preferably also hydrophobic) fluorochemicals. Surface contamination of the face side with oil, which would cause permanent transparentization and prevent re-use, is readily removed by placing the face side of the sheet material in contact with the back side. One use for the product is as an order blank in the fast food industry.

9 Claims, No Drawings

OIL-REPELLENT MICROVOID-IMAGING MATERIAL

BACKGROUND OF THE INVENTION

This invention relates to sheet material, especially a base sheet obscured by an opaque but transparentizable microporous, diffusely light-reflective layer.

For centuries paper has been one of the most versatile substances made by man. Formed from commonly available cellulosic materials, it can be made stiff or flexible, rough or smooth, thick or thin, and provided with any desired color. After it has served its intended purpose, it can often be repulped and used again. In recent years, however, the demands for paper have increased to the extent that it has finally been recognized that the sources of cellulosic raw materials are not inexhaustible. Further, the energy required to manufacture paper is a significant consideration in a world becoming increasingly aware that supplies of energy are also finite. It has also become recognized that, where paper is used as a carrier for indicia, it can generally be used only once, it being impossible or impractical to remove indicia which are no longer needed or desired. There has thus arisen a desire for a substitute for conventional paper, especially one which can be repeatedly and easily reused; even a substitute which was more expensive to manufacture would be less expensive in the long run if it could be reused a sufficient number of times.

Several U.S. patents (e.g., U.S. Pat. Nos. 2,299,991, 3,031,328 and 3,508,344) disclose composite sheet material in which a light-colored opaque blushed lacquer layer is coated over a base sheet that is either dark-colored or imprinted with dark-colored indicia. The opacity and light color of the blushed lacquer coating are due to the inclusion of numerous microvoids; the local application of (1) heat or pressure (either of which irreversibly collapses the microvoids) or (2) a non-solvent liquid having substantially the same refractive index as the lacquer (which fills the microvoids), causes the coating to become selectively transparent and the underlying dark backing to become visible. A liquid employed to impart transparency to the opaque microporous layer can subsequently be evaporated to restore the original appearance.

U.S. Pat. No. 2,854,350 describes structures which are functionally similar to those just described, except that the blushed lacquer coatings are replaced by a microporous layer of finely divided calcium carbonate in an organic binder. Transparency is imparted by locally applying pressure or treating selected areas with a wax, oil or grease having a refractive index similar to that of the calcium carbonate; see U.S. Pat. No. 2,854,350. Other pigments may be incorporated in a microporous highly plasticized resin binder; see U.S. Pat. No. 3,247,006.

It is sometimes desirable to have microvoid-containing sheet material which can be transparentized by applying a liquid, but which cannot readily be transparentized by the application of heat or pressure. In such circumstances, a microvoid-containing layer of the type described in U.S. Pat. No. 4,299,880, owned by applicant's assignee, is preferred. This patent discloses a structure in which the microvoid-containing layer consists essentially of particles held in pseudo-sintered juxtaposition by a thermoset binder and has a cohesion value of at least 400 grams force*.

*The cohesion value is determined by knife-coating a dispersion of a putative composition on a cleaned gray cold rolled steel panel, drying and curing as appropriate for the composition, to provide a coating 50–60 micrometers thick. Using a "Balance Beam Scrape-Adhesion and Mar Tester", sold by Gardner Laboratories, Inc., Bethesda, Md., a sapphire-tipped stylus is lowered into contact with the test panel and held in fixed position while a ball bearing-supported platform moves the panel. The minimum grams-force required to form a 50-micrometer deep scratch in the coating in a single pass is determined at a magnification of 40X and reported as cohesion value.

One important use for the microvoid-containing sheet materials just described is in the manufacture of re-usable order blanks for the fast food industry. Order blanks of this type are typically printed with a list of the various products offered for sale, as well as the number of each type of item which a customer might request. Upon receiving an order, the serving person utilizes a pen filled with a volatile clear "ink" to apply markings in the appropriate places; wherever the "ink" is applied, the microvoid layer is locally transparentized, allowing the dark backing to be seen. An order blank marked in this manner can then be fed into an optical mark recognition device, which automatically computes the total cost of the merchandise purchased. After a time, the volatile "ink" evaporates, so that the order blank can be used again.

One problem encountered with order blanks of the type just described is inadvertent contamination by various liquids in the area. For example, if cooking oil contacts the face of the order blank, it penetrates the microvoids and imparts local transparency. Since such oil is essentially non-volatile, a permanent mark may remain, causing erroneous readings when the order blank is scanned by the optical mark, recognition device. To a lesser extent, similar problems may be caused by spilling soft drinks, coffee, syrup or other water-based liquids on the surface of the order blank. Even if an oil- or water-repellent treatment is applied to the surface of the microvoid layer, the treatment may retard but not completely prevent penetration of the contaminating liquid, especially over an extended period of time. When used blanks are subsequently stacked on top of each other until the volatile "ink" has evaporated, the weight of the stack forces contaminating liquids into the microvoid layer, causing random marks and future erroneous readings by the optical scanner.

DETAILED DESCRIPTION

The present invention provides improved self-supporting sheet material of the type which can be provided with temporary markings by applying a colorless liquid of predetermined volatility, such sheet material comprising (a) a self-supporting, oil- and grease-impermeable dark-colored (preferably infrared-absorbing) base sheet having a face side and a back side and (b) bonded over each side of the base sheet, a diffusely reflective opaque white to pastel microvoid-containing layer comprising an organic polymer having a refractive index in the range of about 1.3 to 2.2. Present at least at the exposed surface of the layer on only the face side of the base sheet is an oleophobic fluorochemical which prevents the microvoids at the face side of the sheet material from being readily penetrated by oil or grease, so that the face side can be penetrated on transparentized by only a limited number of liquids. Depending on the specific oleophobic fluorochemical the useful transparentizing liquids have a low surface tension or are polar. Penetration, of course, effects local transparentization of the face side layer to expose the dark-colored base. The microvoids at the back side of the sheet material, however, remain readily penetrable by almost all liquids, including both polar and non-polar liquids having either low surface tension or high surface tension. This construction ensures that potentially transparentizing contamination of the microvoid layer on the face side of the sheet material, as might be caused by contact with vegetable oil or animal fat can be removed by promptly placing the face side layer in contact with the back side layer of another portion of the sheet material, the contaminating liquid thereupon being absorbed into the adjacent back side layer. (Transparentization of the back side layer does not affect readings made by the optical mark reading equipment, which "sees" only the face side.) Desirably (although less essentially) the face side also resists penetration by water-based substances.

Order blanks or other sheet material made in accordance with the invention, advantageously printed with permanent indicia on the face side, possess a self-cleaning property, so that contaminating liquids which contact the face side and might otherwise lead to erroneous optical mark recognition device readings, are absorbed into the back surface. In other words, despite the possibility that an order blank or other sheet material may be exposed repeatedly to contaminants, its useful life is essentially unaffected by such exposure.

PRESENTLY PREFERRED EMBODIMENTS

Understanding of the invention will be further enhanced by referring to the following illustrative but non-limitative examples, in which all parts, ratios and percentages are by weight unless otherwise noted.

Self-Cleaning Test

In the examples, various types of sheet material were prepared, all having a microvoid-containing layer on both the back and face sides, with an oleophobic fluorochemical treatment on the face side only. The fluorochemical treatment was provided either by applying to the face side a dilute solution of an oleophobic fluorochemical and evaporating the solvent or by incorporating the fluorochemical in the microvoid-forming composition before coating. The product of each example was then evaluated to determine if either a commercial French fry oil (a partially hydrogenated soya bean oil having an iodine number of 102, a density of 0.929, a surface tension of 37 dynes/cm at 23° C., containing about 1% polydimethylsiloxane, available from Procter & Gamble under the trade designation "FRY MAX") or tap water applied to the treated surface would cause localize transparentization within 15 minutes. In each case the oil and water were applied to separate portions of the test specimen, using a medicine dropper to form a circular puddle about 3 cm in diameter. Diffuse reflectance of each area was measured both before and 15 minutes after applying the test liquid. A decrease of 10 or less units (measured on a Hunter color difference meter, L scale) indicates negligible penetration of the liquid and acceptable performance.

The product of each such contaminated example was then evaluated for its self-cleaning properties. The untreated back side of an 11×28 cm sheet of the sheet material in contact with a weighed portion of the treated face side, to which had been applied 10 mg each of French fry oil and tap water in separate 3-cm diameter areas. Sufficient weight was then added in the form of additional sheets to ensure intimate contact; pressures from 0.0013 to 0.5 KPa appeared to be equally effective.

After one hour at room temperature, the previously weighed portion of the sample was again weighed; a weight gain of less than 1 mg was considered to indicate satisfactory self-cleaning properties.

Oleophobic fluorochemical treatment of the face surface tends to limit the types of clear liquid "ink" which can be used to impart the desired localized transparentization. Only liquid "inks" having a low surface tension (i.e., less than about 30 dynes/cm) appear to be useful where the surface has been treated with fluorochemical which renders it both oleophobic and hydrophobic. On the other hand, liquid "inks" which either are polar (e.g., water, glycols, and alcohols) or have a very low surface tension (i.e., less than about 20 dynes/cm) are useful where the fluorochemical has rendered the face side oleophobic but not hydrophobic. Suitable volatile liquids for use as clear marking liquids, having a surface tension of less than about 30 dynes/cm, include perfluorocarbons and liquid polysiloxanes, as well as certain hydrocarbons and alcohols.

Many families of fluorochemicals are effective in imparting the desired oleophobic properties. Because of the variety of fluorochemicals which are effective, and because other fluorochemicals are unexplainably not suitable for the practice of the invention, it has been found helpful to employ a physical test to determine whether a given fluorochemical will be satisfactory, as will now be explained.

Contact Angle Measurement

A string is clipped to one end of a glass microscope slide, which is then quickly immersed in a dilute solution (5% unless solubility is so poor that a less concentrated solution must be employed) of fluorochemical and withdrawn vertically at the rate of 0.12 mm/second, guarding against stray air currents which might cause movement of the slide or uncontrolled evaporation of the solvent. The treated slides are dried at room temperature for 30 minutes, heated 2 minutes at about 120° C. and cooled to room temperature. A drop of the French fry oil previously described is then applied and the contact angle measured. Fluorochemicals which yield a contact angle of at least 60±2° are found to be satisfactory for practicing the invention, while fluorochemicals which yield a lower contact angle are found to be unsatisfactory.

Preferred oleophobic fluorochemicals for surface treatments include chromium complexes of $R_fSO_2N(R')RCOOH$, wherein $R_f$ is a perfluoroalkyl group containing 4–20 carbon atoms, R is an alkylene bridging group containing 1–12 carbon atoms, and R' is H or an alkyl group containing 1–6 carbon atoms; U.S. Pat. No. 2,934,450 discloses such fluorochemicals. Another suitable class of oleophobic fluorochemicals is defined by the structural formula $[R_fSO_2N(R)R'0]_m PO(OX)_{3-m}$, wherein $R_f$ is as just defined, R is H or an alkyl group having 1–12 carbon atoms, R' is an alkylene bridging group having 2–12 carbon atoms, X is H, $NH_4$, Na or $NH_2(C_2H_4OH)_2$, and m is 1 or 2; U.S. Pat. No. 3,094,547 discloses such fluorochemicals. Fluorochemicals are, of course, well known and have been employed as surface treatments for imparting oleophobic or oleophobichydrophobic properties to fibrous sheet material; see, e.g., U.S. Pat. Nos. 2,803,615, 2,934,450, 3,950,298, 3,574,791, 3,916,053, and 2,803,656.

In each of examples 1–19 and comparison examples A–E, tabulated below, one side of 100-micrometer black greaseproof paper was coated with a blend of 77.39 parts toluene, 11.18 parts diisobutylketone, 22.37 parts methylisobutyl-ketone, 41.47 parts of a 60% solids OH-functional acrylic resin (Henkel G-Cure 868 RX-60), 0.9 part di(dioctylpyrophosphato) ethylene titanate, 466 parts 0.5-15 micrometer $CaCO_3$ (Sylacauga Calcium Products "Microwhite" 25), and 7.9 parts of a 75% solution of the biuret of 1,6-hexamethylene diisocyanate (Mobay Chemical Company "Desmodur" N-75). The solvent was then evaporated and the coating cured, leaving a microvoid layer approximately 25 micrometers thick, having a void volume of 35%. The opposite side of the greaseproof paper was then provided with a microvoid layer by coating and curing the same composition.

To the surface of one microvoid layer (hereinafter referred to as the "face" layer) was then applied a dilute (typically 1½–3%) solution of fluorochemical in sufficient quantity to fill the microvoids, after which it was evaporated to leave a dry surface. When tested for self-cleaning properties in accordance with the test previously described, the face side of each sample was readily purged of contamination. In each case, a suitable volatile transparentizing "ink" was available; such inks are listed in the tabulated examples.

TABLE I

| | | Contact Angle Measurement | | | Self-cleaning Characteristics | | |
|---|---|---|---|---|---|---|---|
| Ex. | Fluorochemical | Solvent | Percent Solids | Contact Angle | Oil | Water | Suitable "Ink" |
| 1 | $[C_8F_{17}SO_2N(CH_3)C_2H_4OCH_2CH(CH_2Cl)O_2CCH_2CH_2]_2$ | methyl-isobutylketone | 5 | 90° | Yes | Yes | Perfluoro-tributylamine |
| 2 | $[C_8F_{17}SO_2N(C_2H_5)C_2H_4O]_2POONH_4$ | 1:1 methanol:water | 5 | 80° | Yes | No | propylene glycol |
| 3 | $[C_8F_{17}SO_2N(C_2H_5)C_2H_4O]_2POOH$ | methanol | 1 | 70° | Yes | No | polydimethyl-siloxane* |
| 4 | $[C_8F_{17}SO_2N(C_2H_5)C_2H_4O]_2POONa$ | 1:1 isopropanol:water | 1 | 74° | Yes | No | polydimethyl-siloxane** |
| 5 | $[C_8F_{17}SO_2N(C_2H_5)C_2H_4O]_2POONH_2(C_2H_4OH)_2$ | 1:1 isopropanol:water | 1 | 75° | Yes | No | Water |
| 6 | $[C_8F_{17}SO_2N(C_2H_5)C_2H_4O]_3PO$ | 1,1,2-trifluoro-1,2,2-trichloroethane | 1 | 90° | Yes | Yes | Perfluoro-tributylamine |
| 7 | $C_8F_{17}SO_2N(C_2H_5)C_2H_4OPO(OH)_2$ | 1:1 methanol:water | 5 | 75° | Yes | Yes | Polydimethyl-siloxane*** |
| 8 | $C_8F_{17}SO_2N(C_2H_5)C_2H_4OPO(ONH_4)_2$ | 1:1 methanol:water | 1 | 82° | Yes | No | Polydimethyl-siloxane*** |
| 9 | 50:50 copolymer of $C_8F_{17}SO_2N(CH_3)C_2H_4O_2CCH{=}CH_2$ and dimethacrylate ester of poly(oxyethylene)glycol (molecular weight about 4,000) | 1:1 isopropanol:water | 5 | 90° | Yes | Yes | Polydimethyl-siloxane* |
| 10 | 70:30 copolymer of $C_8F_{17}SO_2N(CH_3)C_2H_4O_2CCHCH_2$ and methoxy poly(oxyethylene)acrylate (molecular weight 750) | 1:1 isopropanol:water | 1 | 93° | Yes | Yes | Perfluoro-tributyl-amine |
| 11 | 95:5 $C_8F_{17}SO_2N(CH_3)C_2H_4O_2CCHCH_2$: $C_4H_9O_2CHCH_2$ copolymer | water | 5 | 82° | Yes | Yes | Polydimethyl-siloxane** |
| 12 | $[C_2F_5(C_2F_4)_{3-8}C_2H_4O]_2POONH_2(C_2H_4OH)_2$ | 1:1 isopropanol:water | 1 | 91° | Yes | Yes | Perfluoro-tributyl-amine |
| 13 | Terpolymer of $C_9F_{19}C_2H_4O_2CCHCH_2$, $CH_2CHCl$, and $CH_2CHCONHCH_2OH$ | 1:1 isopropanol:water | 1 | 77° | Yes | Yes | Polydimethyl-siloxane* |
| 14 | Chrome complex of $C_8F_{17}SO_2N(C_2H_5)CH_2COOH$ | methanol | 5 | 78° | Yes | Yes | Dodecane |
| 15 | Chrome complex of $C_8F_{17}SO_2N(C_2H_5)C_2H_4OPO(OH)_2$ | methanol | 1 | 72° | Yes | No | Polydimethyl-siloxane* |
| 16 | Chrome complex of $C_7F_{15}COOH$ | " | 1 | 76° | Yes | No | Dodecane |
| 17 | 70:30 $C_8F_{17}SO_2N(CH_3)C_2H_4OH$: acrylic acid copolymer | isopropanol | 1 | 76° | Yes | No | " |
| 18 | $C_7H_{15}COONH_4$ | water | 1 | 72° | Yes | No | Polydimethyl-siloxane*** |
| 19 | $C_8F_{17}SO_2N(C_2H_5)CH_2COOK$ | 1:1 isopropanol:water | 1 | 62° | Yes | No | Polydimethyl-siloxane** |
| Comparison A | 70:30 $C_8FSO_2N(C_2H_5)C_2H_4OH$: $CH_3O(C_2H_4O)_nOCCHCH_2$ copolymer | 1:1 isopropanol:water | 5 | 47° | No | No | — |
| Comparison B | 70:30 $C_8F_{17}C_2H_4OCOC(CH_3)CH_2$: $C_8H_{17}OCOCHCH_2$ copolymer | water | 1 | 56° | No | Yes | — |
| Comparison C | $C_8F_{17}SO_3NH_4$ | 1:1 isopropanol:water | 1 | 57° | No | No | — |
| Comparison D | diethanolamine adduct of $C_8F_{17}SO_3$ | 1:1 isopropanol:water | 5 | 39° | No | No | — |
| Comparison | Chrome complex of $C_{14}H_{29}COOH$ | 1:1 isopropanol:water | 5 | 43° | No | Yes | — |

TABLE I-continued

| | | Contact Angle Measurement | | | Self-cleaning Characteristics | | |
|---|---|---|---|---|---|---|---|
| Ex. | Fluorochemical | Solvent | Percent Solids | Contact Angle | Oil | Water | Suitable "Ink" |
| E | | | | | | | |

*boiling point 192° C. at 760 mm Hg
**boiling point 100° C. at 760 mm Hg
***boiling point 70–100° C. at 0.5 mm Hg Substantially the same results are obtained when the backing sheet is greaseproof plastic or paper which is both waterproof and greaseproof.

EXAMPLE 20

Following the general procedure described in U.S. Pat. No. 2,854,350, a control was prepared by placing 39.6 grams of water, 0.4 gram sodium alginate and 5 grams precipitated calcium carbonate in a 4-ounce (approximately 125-cc) jar and ball milling for several days. The resulting composition was knife-coated, at a thickness of approximately 200 micrometers, onto the surface of black 60-micrometer greaseproof paper and allowed to dry at room temperature overnight; the dried microvoid-containing coating was approximately 25 micrometers thick. A similar coating was applied to the opposite face in the same manner. The face side of a portion of the sheet material just described was then treated in the same manner as in Example 6 and subjected to the contamination and self-cleaning tests described, performing successfully in each case. A suitable marking liquid was polydimethyl siloxane.

EXAMPLE 21

Example 20 was repeated, substituting the oleophobic fluorochemical of Example 1. Contamination resistance and self-cleaning test results were satisfactory. A suitable marking ink was found to be perfluorotributylamine.

EXAMPLE 22

Following the general procedure described in U.S. Pat. No. 3,508,344, a control was prepared by placing 75.1 grams acetone, 6.6 grams polymethyl methacrylate ("Elvacite" 2041, available from E. I. duPont de Nemours & Co.), 1.6 grams diethylphthalate, 1.1 grams polyacrylate ("Rhoplex" B-15, available from Rohm & Haas Company) and 11.0 grams of water in an 8-ounce (approximately 250-cc) jar and ball milling overnight. The resulting composition was knife-coated onto the black greaseproof paper used in Example 1 and allowed to dry at room temperature to leave a microvoid-containing coating approximately 50 micrometers thick. A similar coating was then applied in the same way to the opposite side of the sheet material. The face side of the sheet material just described was coated with the oleophobic fluorochemical of Example 1 and subjected to the same types of tests. Results were comparable. Sheet material was conveniently marked, using as a transparent "ink" polydimethyl siloxane.

EXAMPLE 23

Sheet material substantially similar to that just described was prepared and coated with the face side with the dilute solution of the oleophobic fluorochemical described in Example 14. When subjected to the tests previously described, the results were comparable. A suitable "ink" is dodecane.

EXAMPLE 24

Sheet material generally similar to that of previous examples was prepared using a black greaseproof 60-micrometer paper backing and a microvoid coating of the type described in U.S. Pat. No. 3,247,006. Specifically, a mixture of 28.5 parts toluene, 6 parts vinyl toluene butadiene resin (Goodyear "Prolite" VT), 6 parts diphenyl phthalate, and 18 parts magnesium carbonate was ball milled overnight, knife coated onto both sides of the backing and the solvent evaporated to leave a dried 20-micrometer coating on each face. A portion of the face surface of this product was treated with the oleophobic fluorochemical described in Example 1. Test results were comparable. A suitable marking ink for this product was cyclic hexamethyltrisiloxane.

EXAMPLE 25

A portion of the face surface of the sheet material described in the preceding example was coated with a dilute solution of the oleophobic fluorochemical described in connection with Example 14. Test results were comparable. A suitable marking ink was found to be octane.

EXAMPLE 26

This example illustrates incorporation of the fluorochemical directly into the microvoid-forming face layer composition. Accordingly, 40 parts toluene, 2.4 parts diisobutylketone, 7.85 parts of a 60% solution of hydroxy-functional acrylic resin (Henkel G-Cure 867-RX-60), 0.2 part di(dioctylpyrophosphato) ethylene titanate (Kenrich KR-238s), 100 parts 0.5–15 micrometer calcium carbonate (Sylacauga Calcium Products "Microwhite" 25), 2.2 parts of a 75% solution of the biuret of 1-6, hexamethylene diisocyanate (Mobay "Desmodur" N-75) and 0.6 part of $[C_8F_{17}SO_2N(CH_3)C_2H_4OCH_2CH(CH_2Cl)O_2CCH_2CH_2]_2$ were ball milled together. The resultant mixture was knife-coated onto a 100-micrometer black greaseproof paper backing and dried and cured at room temperature to form a 20-micrometer microvoid coating. An identical coating, except for omission of the fluorochemical, was coated onto the other side of the backing. The face side exhibited satisfactory oil and water repellency and was self-cleaning. A suitable "ink" was polydimethylsiloxane.

It will be readily appreciated that the foregoing description is not intended to be exhaustive, and it is believed that those skilled in the art will readily devise other products embodying the principles taught in the invention.

Accordingly, what is claimed is as follows:

1. A self-supporting sheet material which is adapted to being provided with markings by the application of a colorless liquid of predetermined volatility, comprising in combination:

a. a self-supporting dark-colored base sheet having a face side and a back side and b. bonded over each side of said base sheet, a diffusely reflective opaque white to pastel microvoid-containing layer comprising an organic polymer having a refractive index in the range of about 1.3 to 2.2, c. present at least at the exposed surface of the layer on only the face side of the base sheet, an oleophobic fluorochemical which prevents the microvoids at the face side from being readily penetrated by oil and grease, so that the microvoids at the face side of sheet material can be penetrated and transparentized only by polar liquids or liquids having a low surface tension, such penetration effecting local transparentization of the face side layer to expose the dark-colored base, whereas the microvoids at the back side of the sheet material are readily penetrated by both polar and non-polar liquids having either low surface tension or high surface tension, whereby potentially transparentizing contamination of the layer on the face side of said sheet material, caused by contact with oil and the like, can be removed by promptly placing the face side layer in contact with the back side layer of another portion of the sheet material, the contaminating liquid being absorbed into the back side layer of the sheet material.

2. The sheet material of claim 1 wherein the oleophobic fluorochemical provides a surface on which French fry oil forms a contact angle of at least 60° when tested as herein described.

3. The sheet material of claim 2 wherein each microvoid-containing layer includes particles which have a refractive index in the range of about 1.3 to 2.2, said particles being held in pseudo-sintered juxtaposition by the organic polymer, said polymer being thermoset.

4. The sheet material of claim 2 or 3 wherein the face side of the sheet material is imprinted with indicia to provide a form on which to place temporary markings in specific locations for reading in an optical mark recognition device, said form being repeatedly re-usable.

5. The sheet material of claim 4 wherein the oleophobic fluorochemical is a chrome complex of $R_fSO_2N(R')RCOOH$, wherein $R_f$ is a perfluoroalkyl group, containing 4 to 20 carbon atoms, R is an alkylene bridging group containing 1–12 carbon atoms, and R' is H or an alkyl group containing 1 to 6 carbon atoms.

6. The sheet material of claim 5 wherein the oleophobic fluorochemical is $C_8F_{17}SO_2N(C_2H_5)CH_2COOH$.

7. The sheet material of claim 4 wherein the oleophobic fluorochemical has the structural formula $[R_fSO_2N(R)R'O]_mPO(OX)_{3-m}$, wherein $R_f$ is a perfluoroalkyl group containing 4–20 carbon atoms, R is H or an alkyl group having 1–12 carbon atoms, R' is an alkylene bridging group having 2–12 carbon atoms, X is H, $NH_4$, Na or $NH_2(C_2H_4OH)_2$, and m is 1 or 2.

8. The sheet material of claim 7 wherein the oleophobic fluorochemical is $C_8F_{17}SO_2N(C_2H_5)C_2H_4OPO(OH)_2$.

9. The sheet material of claim 7 wherein the oleophobic fluorochemical is $[C_8F_{17}SO_2N(C_2H_5)C_2H_4O]_3PO$.

* * * * *